(12) United States Patent
Crist et al.

(10) Patent No.: US 8,475,308 B2
(45) Date of Patent: Jul. 2, 2013

(54) BELT TENSIONER AND METHOD FOR MAKING A BELT-TENSIONER ARM AND A SPRING CASE

(75) Inventors: Robert J. Crist, Greene County, MO (US); Kevin G. Dutil, Springfield, MO (US); Robert C. Joslyn, Christian County, MO (US); Anthony E. Lannutti, Republic, MO (US); Earl E. McShane, Springfield, MO (US); Steve E. Scott, Springfield, MO (US); Stephen G. Webb, Springfield, MO (US)

(73) Assignee: Dayco IP Holdings, LLC, Springfield, MO (US)

( * ) Notice: Subject to any disclaimer, the term of this patent is extended or adjusted under 35 U.S.C. 154(b) by 0 days.

(21) Appl. No.: 12/208,420

(22) Filed: Sep. 11, 2008

(65) Prior Publication Data

US 2009/0005202 A1 Jan. 1, 2009

Related U.S. Application Data

(63) Continuation of application No. 10/982,718, filed on Nov. 5, 2004, now Pat. No. 7,448,974.

(51) Int. Cl.
*F16H 7/12* (2006.01)
(52) U.S. Cl.
USPC ............................................. 474/135
(58) Field of Classification Search
USPC ................... 474/135, 117, 118, 133; 267/155
See application file for complete search history.

(56) References Cited

U.S. PATENT DOCUMENTS

| | | | |
|---|---|---|---|
| 4,557,707 A | 12/1985 | Thomey | |
| 4,596,538 A | 6/1986 | Henderson | |
| 4,696,663 A * | 9/1987 | Thomey et al. | 474/133 |
| 4,698,049 A | 10/1987 | Bytzek et al. | |
| 4,816,011 A * | 3/1989 | Kotzab | 474/111 |
| 4,834,694 A * | 5/1989 | Martin | 474/135 |

(Continued)

FOREIGN PATENT DOCUMENTS

| | | |
|---|---|---|
| EP | 1290359 | 9/2004 |
| JP | 2002-323100 | 11/2002 |

(Continued)

OTHER PUBLICATIONS

EP, Supplementary Partial European Search Report, European Application No. 05824897.2 (Jun. 23, 2010).

(Continued)

*Primary Examiner* — Robert A Siconolfi
*Assistant Examiner* — Stephen Bowes
(74) *Attorney, Agent, or Firm* — Thompson Hine LLP

(57) ABSTRACT

A belt tensioner includes an arm, a spring case, and a helical spring having inwardly projecting first and second end portions. Another belt tensioner includes a spring, an arm, a spring case, and a pivot bushing surrounding the spring. An additional belt tensioner includes an idler pulley having a bearing with a mounting hole and includes an arm having a post. The post is positioned in the mounting hole, and an annular rim of the post is deformed radially outward and over the bearing. A method for manufacturing an arm and a spring case of a belt-tensioner includes obtaining a belt-tensioner-arm casting mold including a first section and a second section and obtaining a belt-tensioner-spring-case casting mold including a first segment and a second segment.

18 Claims, 3 Drawing Sheets

U.S. PATENT DOCUMENTS

| | | | |
|---|---|---|---|
| 4,971,589 A | 11/1990 | Sidwell et al. | |
| 5,057,059 A | 10/1991 | Sidwell et al. | |
| 5,149,306 A | 9/1992 | Sidwell et al. | |
| 5,250,009 A | 10/1993 | Sidwell et al. | |
| 5,354,242 A * | 10/1994 | St. John | 474/135 |
| 5,478,285 A | 12/1995 | Bakker et al. | |
| 5,620,385 A | 4/1997 | Cascionale et al. | |
| 5,647,813 A * | 7/1997 | Serkh | 474/135 |
| 5,772,549 A | 6/1998 | Berndt et al. | |
| 5,795,257 A | 8/1998 | Giese et al. | |
| 5,803,849 A * | 9/1998 | Ayukawa | 474/94 |
| 5,803,850 A * | 9/1998 | Hong et al. | 474/135 |
| 5,964,674 A | 10/1999 | Serkh et al. | |
| 6,004,235 A | 12/1999 | Ohta et al. | |
| 6,217,470 B1 | 4/2001 | Quintus | |
| 6,575,860 B2 | 6/2003 | Dutil | |
| 6,855,079 B2 | 2/2005 | Cura et al. | |
| 6,857,979 B2 | 2/2005 | MacNaughton et al. | |
| 2002/0177499 A1 | 11/2002 | Ayukawa et al. | |
| 2003/0153422 A1 | 8/2003 | Quintus | |
| 2003/0216204 A1 | 11/2003 | Serkh et al. | |
| 2004/0235598 A1 * | 11/2004 | Kawasaki et al. | 474/135 |
| 2005/0043131 A1 | 2/2005 | Asbeck et al. | |

FOREIGN PATENT DOCUMENTS

| | | | |
|---|---|---|---|
| JP | 2003120770 A * | 4/2003 | |
| JP | 2004-068849 | 3/2004 | |
| WO | 0196762 | 12/2001 | |
| WO | 2005/022001 | 3/2005 | |

OTHER PUBLICATIONS

PCT, International Search Report, International Application No. PCT/US2005/039504 (mailed Aug. 24, 2006; published Nov. 23, 2006).

PCT, International Preliminary Report on Patentability, International Application No. PCT/US2005/039504 (Dec. 26, 2006).

US, Office Action, U.S. Appl. No. 10/982,718 (Feb. 12, 2008).

US, Notice of Allowance, U.S. Appl. No. 10/982,718 (Sep. 16, 2008).

AU, Examiner's First Report, Australian Application No. 2006324417 (Feb. 7, 2011).

JP, Notice of Reason(s) for Rejection, Japanese Application No. 2007-539299 (Feb. 15, 2011).

AU, Office Action, Australian Application No. 2005305069 (Sep. 14, 2010).

CN, First Office Action, Chinese Application No. 200680046902.2 (Feb. 5, 2010).

CN, First Office Action, Chinese Application No. 200580041721.6 (Dec. 19, 2008).

AU, Examiner's Second Report, Australian Application No. 2006324417 (Aug. 30, 2011).

* cited by examiner

8,475,308 B2

BELT TENSIONER AND METHOD FOR MAKING A BELT-TENSIONER ARM AND A SPRING CASE

This application is a continuation of U.S. application Ser. No. 10/982,718, filed Nov. 5, 2004 now U.S. Pat. No. 7,448,974.

TECHNICAL FIELD

The present invention relates generally to tensioning devices, and more particularly to a belt tensioner and to a method for making a belt-tensioner arm and a spring case.

BACKGROUND OF THE INVENTION

The automotive industry utilizes belt tensioners to create a generally constant tension on a belt as it changes in length from normal wear, or from changes in span lengths due to span speed differences, wherein the belt is driven by a single drive pulley from the output shaft of the engine and wherein the belt rotates driven pulleys, each operating an automotive accessory. In known designs, the belt tensioner includes either a flat-wound spring or a helical spring, a spring casing, and an arm. One end of the spring is attached to the spring casing and the other end of the spring is attached to the arm. The arm pivots with respect to the spring casing when the spring exerts torque. The spring casing is attached to the engine, and an idler pulley is attached to the arm. The spring is preloaded by twisting the arm relative to the spring casing. The idler pulley on the arm is then placed against the belt. As the belt span lengthens, the torque from the preloaded spring continues to cause the idler pulley of the arm to apply pressure against the belt keeping the belt in tension.

In one known arrangement patented as U.S. Pat. No. 5,772,549, a helical spring has a first end screwed into a first screw-like passage of the arm of the spring tensioner and has a second end screwed into a second screw-like passage of the spring casing. The spring is under tension and holds the parts together while permitting the arm to rotate relative to the spring casing. A cone-shaped bushing is disposed inside the spring between a portion of the arm and a portion of the spring casing to facilitate the rotation of the arm relative to the spring casing. This arrangement is open to contamination and the spring configuration creates a moment loading.

In one known example of a belt tensioner, a square-shaped hole in the idler pulley is engaged by a square head, often as would be common to a ½" or ⅜" leveraging or ratchet or similar wrench, to lift (preload) the arm. In a different known example, the idler pulley is mounted on a post of the arm, wherein the post has an annular rim which is deformed radially outward and over the bearing of the idler pulley creating a radial rivet joint to retain the idler pulley to the arm.

In one known method, the arm is cast using a mold having first and second sections, and the spring case is cast using a mold having first and second segments. In this method, a path in the belt tensioner from the arm's seat for the bearing of the idler pulley to the engine mounting surface of the spring case crosses a line on the spring case corresponding to the parting line of the first and second segments.

Still, engineers continue to seek improved belt tensioners.

SUMMARY OF THE INVENTION

A first expression of an embodiment of the invention is for a belt tensioner including a belt-tensioner helical spring, a belt-tensioner arm, and a belt-tensioner spring case. The helical spring has inwardly projecting first and second end portions. The arm is adapted to support an idler pulley and has a first hook portion, wherein the first end portion of the helical spring is retained by the first hook portion of the arm. The spring case has a second hook portion, wherein the second end portion of the helical spring is retained by the second hook portion of the spring case.

A second expression of an embodiment of the invention is for a belt tensioner including a belt-tensioner spring, a belt-tensioner arm, a belt-tensioner spring case, and a pivot bushing. The spring has first and second end portions. The arm is in contact with the first end portion of the spring and is adapted to support an idler pulley. The spring case is in contact with the second end portion of the spring. The pivot bushing circumferentially surrounds the spring, has a substantially outward or inward flared cone portion, and has a substantially constant diameter cylinder portion.

A third expression of an embodiment of the invention is for a belt tensioner including an idler pulley and a belt-tensioner arm. The idler pulley has a bearing including a mounting hole having a longitudinal axis. The arm includes a post, wherein the post is positioned in the mounting hole of the bearing of the idler pulley and extends longitudinally beyond the bearing. The post has an annular rim deformed radially outward and over the bearing of the idler pulley creating a radial rivet joint. The post has a non-circular hole portion located longitudinally below the annular rim and adapted for engagement by a belt-tensioner arm-lifting tool.

A method of the invention is for manufacturing an arm and a spring case of a belt tensioner, wherein the arm has a bearing seat adapted to support a bearing of an idler pulley and has an arm-to-bushing mounting surface adapted to support a pivot-bushing and wherein the spring case includes an ear having a belt-tensioner mounting surface. The method includes several steps. One step includes obtaining a belt-tensioner-arm casting mold including a first section and a second section, wherein the first section has a first surface portion for casting the bearing seat and a second surface portion for casting the arm-to-bushing mounting surface. Another step includes positioning the first and second sections together along a parting line. Another step includes casting the arm using the disposed first and second sections. Another step includes obtaining a belt-tensioner-spring-case casting mold including a first segment and a second segment, wherein the first segment includes a surface portion for casting the belt-tensioner mounting surface of the ear. Another step includes positioning the first and second sections together along a parting line. Another step includes casting the spring case using the disposed first and second segments, wherein a path in the belt tensioner from the bearing seat to the belt-tensioner mounting surface does not cross a line on the arm corresponding to the parting line of the first and second sections and does not cross a line on the spring case corresponding to the parting line of the first and second segments.

Several benefits and advantages are derived from one or more of the expressions of an embodiment and method of the invention. Having inwardly projecting first and second end portions of a belt-tensioner helical spring avoids out-of-plane loads or couples from assembly forces. A pivot bushing with a substantially outward or inward flared cone portion and a substantially constant diameter cylinder portion delivers improved offset control (via the cone portion) and alignment guidance (via the cylinder portion). Having a belt-tensioner arm including a post having an annular rim and having a non-circular hole portion below the annular rim enables a radial rivet joint to secure an idler pulley to the post and enables access to the non-circular hole portion of the post by a belt-tensioner arm-lifting tool to lift the arm for placing it against a belt creating tension in the belt. Having a path in the belt tensioner from the bearing seat to the belt-tensioner mounting surface which does not cross a line on the arm corresponding to the parting line of the first and second sections and which does not cross a line on the spring case corresponding to the parting line of the first and second segments minimizes the casting effect on offset and alignment as can be appreciated by those skilled in the art.

DETAILED DESCRIPTION

Figure 1:
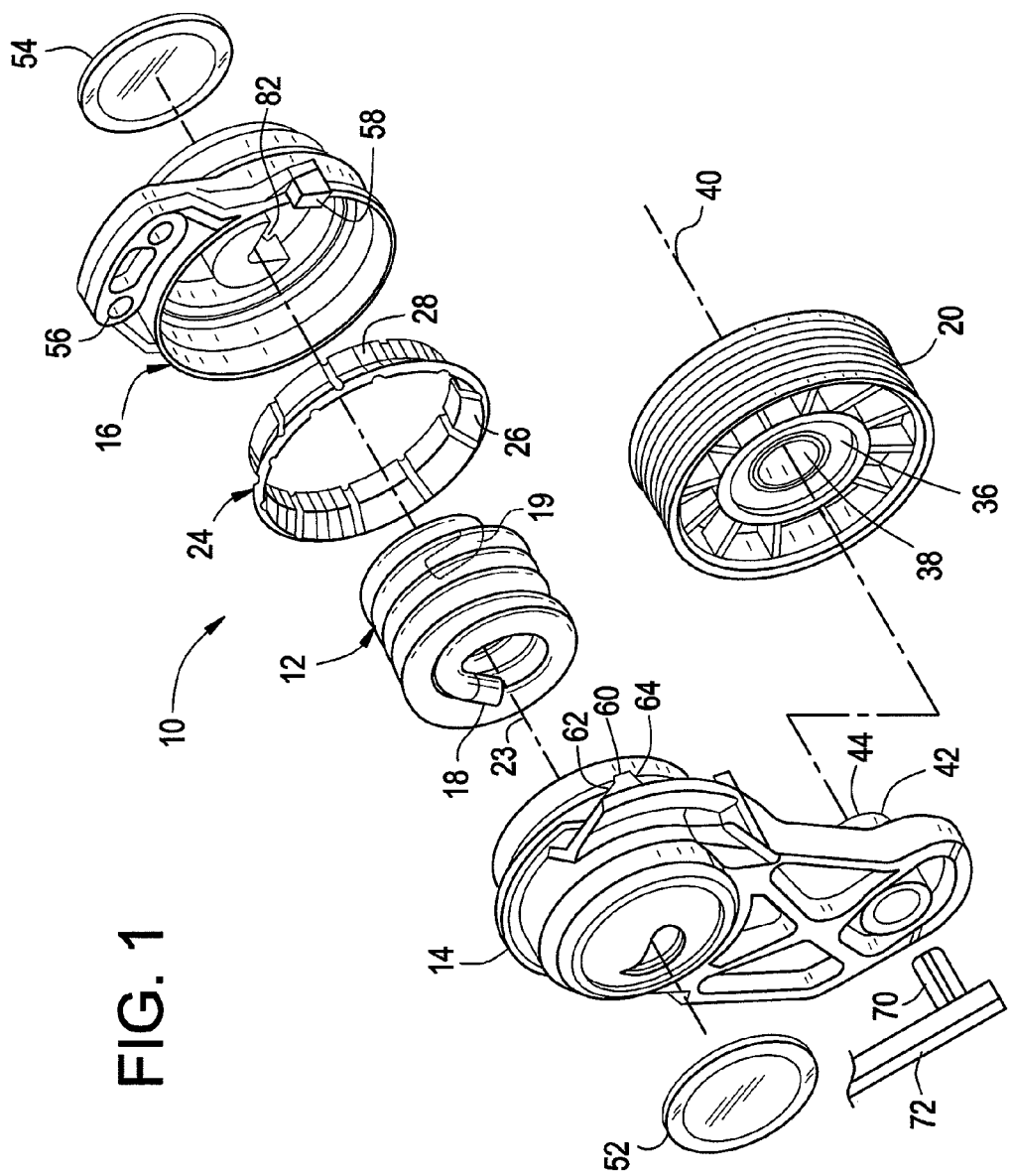
FIG. 1 is an exploded view of an embodiment of the belt tensioner of the invention including an idler pulley.
Figure 2:
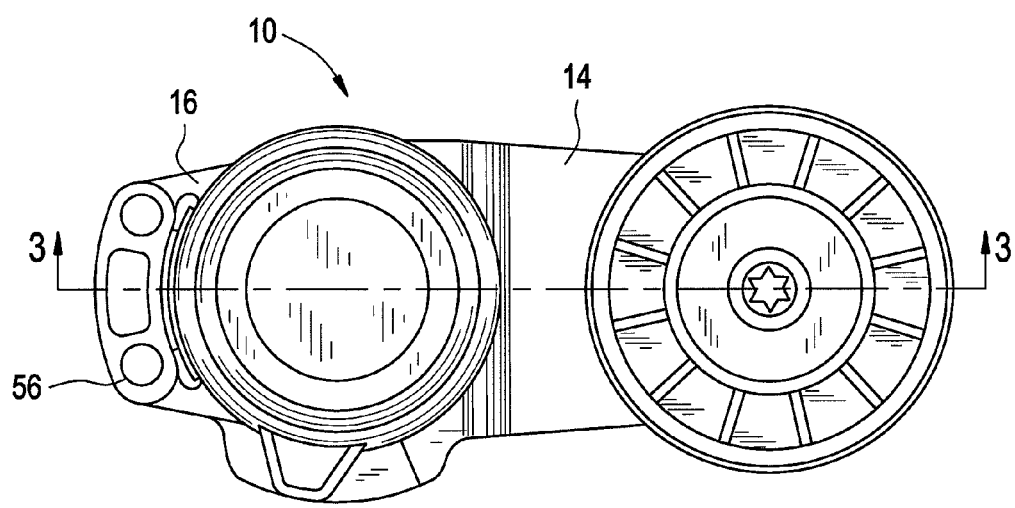
FIG. 2 is a planar view of the assembled belt tensioner of FIG. 1 in a direction looking down on the idler pulley.
Figure 3A:
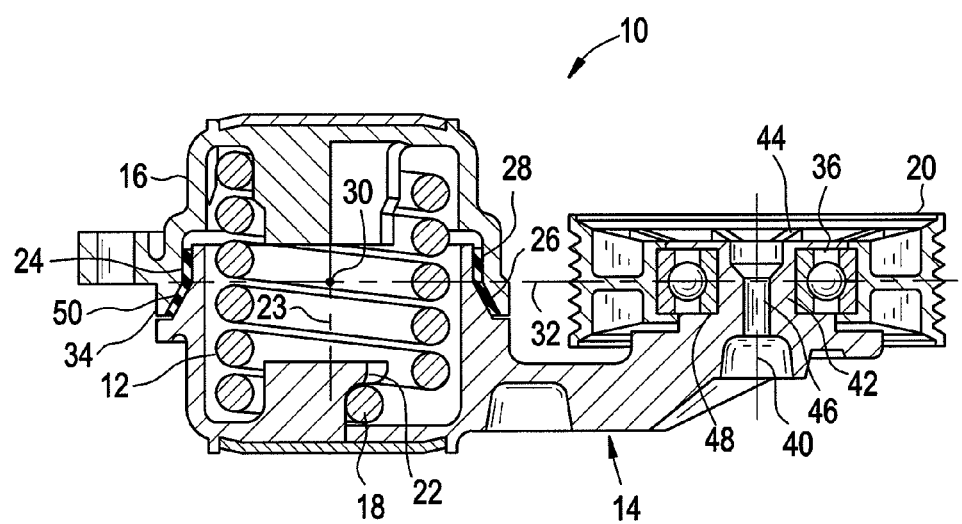
FIG. 3A is a cross-sectional view of the assembled belt tensioner of FIG. 2 taken along lines 3-3 of FIG. 2.
Figure 3B:
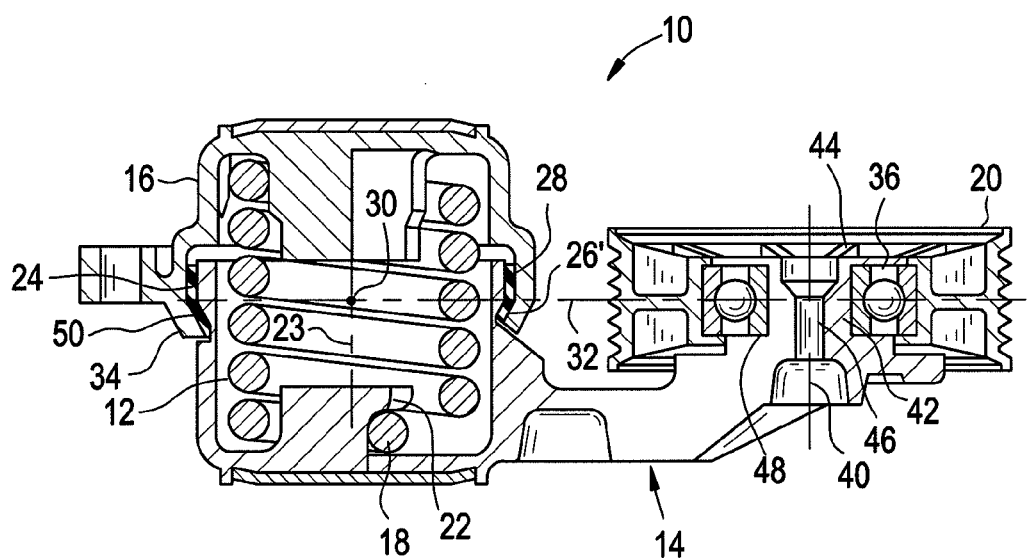
FIG. 3B is a cross-sectional view of an alternate embodiment of an assembled belt tensioner.

Referring now to the drawings, FIGS. 1-3 illustrate an embodiment of the present invention. A first expression of the embodiment shown in FIGS. 1-3 is for a belt tensioner 10 including a belt-tensioner helical spring 12, a belt-tensioner arm 14, and a belt-tensioner spring case 16. The belt-tensioner helical spring 12 has inwardly projecting first end portion 18 and second end portion 19. In one example, the second end portion 19 is substantially identical to the first end portion 18. The belt-tensioner arm 14 is adapted to support an idler pulley 20 and has a first hook portion 22. The first end portion 18 of the helical spring 12 is retained by the first hook portion 22 of the arm 14. The belt-tensioner spring case 16 has a second hook portion 82. In one example, the second hook portion 82 of the spring case 16 functions substantially identically to the first hook portion 22 of the arm 14. The second end portion 19 of the helical spring 12 is retained by the second hook portion 82 of the spring case 16. It is noted that the inward spring tang (i.e. end portion) orientation automatically creates a zero-moment spring force as can be appreciated by the artisan.

In one implementation of the first expression of the embodiment of FIGS. 1-3, the first and second end portions 18, 19 of the helical spring 12 each project substantially radially inward. In one variation, the helical spring 12 is coiled about a longitudinal axis 23 defining an inner spring diameter and the tip of the first end portion 18 of the helical spring 12 is disposed closer to the longitudinal axis 23 than to the inner diameter of the helical spring 12.

In one example of the embodiment of FIGS. 1-3, the helical spring 12 is in tension. It is noted that a controlled axial stretch of the helical spring 12 sustains force on, in one example, an alignment-controlling pivot bushing (to be described later) with the spring tension applying a continued force to the pivot bushing, for sustained damping and alignment control, even as the pivot bushing wears thinner throughout the duty cycle. In one application of the first expression of the embodiment of FIGS. 1-3, the helical spring 12 is rotationally pulled upon windup. This will cause the helical spring 12 to elongate upon windup and thus decrease the contact pressure and wear on, in one example, the pivot bushing. In one variation this is optimized for improved product function. In a different application (and mirrored coil and hook construction) of the first expression of the embodiment of FIGS. 1-3, the helical spring 12 is rotationally pushed upon windup. This will cause increased axial force to be placed upon, in one example, the pivot bushing enabling a level of positionally-asymmetric damping as can be appreciated by the artisan. In one variation of either or both applications, the helical spring 12 is a round-wire spring.

In one enablement of the first expression of the embodiment of FIGS. 1-3, the belt tensioner 10 also includes a pivot bushing 24 disposed between, and in contact with, the arm 14 and the spring case 16 and circumferentially surrounding the helical spring 12. In one variation, the helical spring 12 is in tension, the spring case 16 includes a protrusion 58 having a blocking surface, the arm 14 includes a locking portion 60 having a blocking surface 64, at least one of the locking portion 60 and the protrusion 58 has a leading inclined surface (or ramp) 62, and wherein self unwinding of the helical spring 12 and disassembly of the belt tensioner 10 is prevented by engagement of the blocking surface of the protrusion 58 with the blocking surface 64 of the locking portion 60. This variation enables a single motion, self-locking method of assembly of the belt tensioner 10 as can be appreciated by those skilled in the art. In one example, the substantially consistent spring positioning from the self-locking method eliminates play of the spring and its effect on torque variation.

In one modification, the pivot bushing 24 includes a substantially outward flared cone portion 26 (FIG. 3A) or inward flared cone portion 26' (FIG. 3B) and a substantially constant diameter cylinder portion 28. In one configuration, the cone portion 26 is disposed closer to the first end portion 18 of the helical spring 12 than is the cylinder portion 28. In another configuration, not shown, the cone portion is disposed closer to the second end portion 19 of the spring than is the cylinder portion. In one application, the cone portion 26 and the cylinder portion 28 are disposed radially between, and in contact with, the arm 14 and the spring case 16, the construction of which permits one to optimize for wear vs. load. The horizontal portion of cone 26 serves to minimize offset change with increased area, and the vertical portion of cone 26 works in conjunction with the cylinder portion 28 serving for alignment guidance as can be appreciated by those skilled in the art.

In one illustration, the belt tensioner 10 also includes an idler pulley 20 supported by the arm 14, wherein the pivot bushing 24 has a centroid (indicated by a dot 30), wherein the idler pulley 20 has a plane of belt loading (indicated by a dashed line 32), and wherein the centroid 30 is disposed proximate the plane of belt loading 32. In one construction, the centroid 30 lies substantially in the plane of belt loading 32. Having the bushing centroid essentially in the plane of belt loading minimizes moment loading.

In one arrangement, the spring case 16 has a case rim 34, and the cone portion 26 of the pivot bushing 24 is disposed proximate the case rim 34. Having the pivot bushing 24 be located in a most radially outward position takes full advantage of available annular wear surface.

One procedure for assembling the belt tensioner 10 of the first expression of the embodiment of FIGS. 1-3, wherein the helical spring 12 is rotationally pulled upon windup and the second hook portion 82 of the spring case 16 is ramped, includes steps a) through c). Step a) includes disposing the first end portion 18 of the helical spring 12 in contact with the arm 14. Step b) includes disposing the second end portion 19 of the helical spring 12 in contact with the spring case 16. Step c) includes relatively twisting the arm 14 and the spring case 16 trapping the first end portion 18 under the first hook portion 22 of the arm 14 and the second end portion 19 under the second hook portion 82 of the spring case 16 and pulling the helical spring 12 in tension. In one variation, counter rotation is prevented by a protrusion 58 on the spring case 16 and a locking portion 60 on the arm 14, the locking portion 60 having a leading inclined surface 62 and a blocking surface 64, wherein the protrusion 58 rides up and over the inclined surface 62 and down the blocking surface 64 of the locking portion 60 during step c), wherein counter rotation is prevented by counter rotational engagement of the protrusion 58 with the blocking surface 64 of the locking portion 60, and wherein disassembly is accomplished by pulling the spring case 16 and the arm 14 apart a distance to allow the protrusion 58 to clear the blocking surface 64 of the locking portion 60 whereupon counter rotation is enabled. In this variation, there is a self-locking together of the arm 14 and the spring case 16. Self-locking tangs on the arm and spring case make for rapid, robust assembly. Other such variations providing self-locking (including having the protrusion on the arm and/or having the protrusion be inclined) are left to the artisan. In a different variation, fasteners are used to secure together the arm 14 and the spring case 16 after the first and second end portions 18, 19 are longitudinally trapped to prevent counter rotation and disassembly.

A second expression of the embodiment shown in FIGS. 1-3 is for a belt tensioner 10 including a belt-tensioner spring (e.g., helical spring 12), a belt-tensioner arm 14, a belt-tensioner spring case 16, and a pivot bushing 24. The belt-tensioner spring (e.g., helical spring 12) has first and second end portions 18, 19. The belt-tensioner arm 14 is in contact with the first end portion 18 of the spring (e.g., helical spring 12) and is adapted to support an idler pulley 20. The belt-tensioner spring case 16 is in contact with the second end portion 19 of the spring (e.g., helical spring 12). The pivot bushing 24 circumferentially surrounds the spring (e.g., helical spring 12), has an outwardly-flared cone portion 26, and has a substantially constant diameter cylinder portion 28.

In one example of the second expression of the embodiment of FIGS. 1-3, the cone portion 26 is disposed closer to the first end portion 18 of the spring (e.g., helical spring 12) than is the cylinder portion 28. In another example, not shown, the cone portion is disposed closer to the second end portion 19 of the spring than is the cylinder portion. In one construction, the spring is a helical spring 12. In another construction, not shown, the spring is a flat-wound spring. In one arrangement of the second expression of the embodiment of FIGS. 1-3, the cone portion 26 is flared outwardly. In another arrangement, the cone portion is flared inwardly.

In one implementation of the second expression of the embodiment of FIGS. 1-3, the cone portion 26 and the cylinder portion 28 are disposed radially between, and in contact with, the arm 14 and the spring case 16. In one variation, the belt tensioner 10 also includes an idler pulley 20 supported by the arm 14, wherein the pivot bushing 24 has a centroid 30, wherein the idler pulley 20 has a plane of belt loading 32, and wherein the centroid 30 is disposed proximate the plane of belt loading 32. In one modification, the centroid 30 lies substantially in the plane of belt loading 32 to decrease moment loading.

In one configuration of the second expression of the embodiment of FIGS. 1-3, the spring case 16 has a case rim 34, and the cone portion 26 is disposed proximate the case rim 34. In one deployment of the second expression of the embodiment of FIGS. 1-3, the belt tensioner 10 is substantially devoid of any gap between the spring case 16 and the pivot bushing 24 and between the arm 14 and the pivot bushing 24. This location of the pivot bushing 24 enables the pivot bushing 24 to act as a sealing device mitigating contaminant entry into the belt tensioner 10 as can be appreciated by those skilled in the art.

The previously described examples, procedures, etc. of the first expression of the embodiment of FIGS. 1-3 are equally applicable to the second expression of the embodiment of FIGS. 1-3.

A third expression of the embodiment of FIGS. 1-3 is for a belt tensioner 10 including an idler pulley 20 and a belt-tensioner arm 14. The idler pulley 20 has a bearing 36 including a mounting hole 38 having a longitudinal axis 40. The belt-tensioner arm 14 includes a post 42. The post 42 is disposed in the mounting hole 38 of the bearing 36 of the idler pulley 20 and extends longitudinally beyond the bearing 36. The post 42 has an annular rim 44 deformed radially outward and over the bearing 36 of the idler pulley 20 creating a radial rivet joint. The post 42 has a non-circular hole portion 46 disposed longitudinally below the annular rim 44 and adapted for engagement by a belt-tensioner arm-lifting tool (not shown). In one arrangement, the non-circular hole portion 46 is a star-shaped orifice, and the non-circular head is a star-shaped head (such as a T-50 TORX® head). In other arrangements, not shown, the non-circular hole portion has a multi-lobed shape, a hex-shape, or a slot shape. In one implementation, the belt-tensioner arm-lifting tool is wrench such as a ratchet or similar wrench. The annular rim 44 of the post 42 allows assembly of the idler pulley 20 to the post by a radial rivet joint (by simply deforming the annular rim 44 over the bearing 36 of the idler pulley 20) avoiding use of a bolt. The non-circular hole portion 46 (e.g., star-shaped orifice) of the post 42 below the annular rim 44 allows lifting (i.e., rotating) the arm 14 of an assembled belt tensioner 10 (when, for example, the spring case 16 is mounted to an automotive engine) with, for example, a ratchet or similar wrench equipped with a TORX® or hex head. Thus, the post 42 saves space in providing both the lift-lug geometry to lift the arm 14 and a radial rivet joint to secure the bearing 36 of the idler pulley 20.

The previously described examples, procedures, etc. of the first and/or second expressions of the embodiment of FIGS. 1-3 are equally applicable to the third expression of the embodiment of FIGS. 1-3.

A method of the invention is for manufacturing an arm 14 and a spring case 16 of a belt tensioner 10. The arm 14 has a bearing seat 48 adapted to support a bearing 36 of an idler pulley 20 and has an arm-to-bushing mounting surface 50 adapted to support a pivot-bushing 24. The spring case 16 includes an ear (the protruding portion of the spring case 16 having the mounting holes 56) having a belt-tensioner mounting surface (the longitudinally facing surface of the ear seen in FIG. 1). The method includes several steps. One step includes obtaining a belt-tensioner-arm casting mold (not shown) including a first section and a second section, wherein the first section has a first surface portion for casting the bearing seat 48 and a second surface portion for casting the arm-to-bushing mounting surface 50. Another step includes disposing the first and second sections together along a parting line. Another step includes casting the arm 14 using the disposed first and second sections. Another step includes obtaining a belt-tensioner-spring-case casting mold (not shown) including a first segment and a second segment, wherein the first segment includes a surface portion for casting the belt-tensioner mounting surface of the ear. Another step includes disposing the first and second sections together along a parting line. Another step includes casting the spring case 16 using the disposed first and second segments, wherein a path in the belt tensioner 10 from the bearing seat 48 to the belt-tensioner mounting surface does not cross a line on the arm 14 corresponding to the parting line of the first and second sections and does not cross a line on the spring case 16 corresponding to the parting line of the first and second segments.

In one implementation of the method, the arm-casting step uses only the disposed first and second sections (i.e., there are no other mold sections). In the same or a different implementation, the spring-case-casting step uses only the disposed first and second segments (i.e., there are no other mold segments). In the same or a different implementation, the belt-tensioner mounting surface is disposable in contact with an engine.

It is noted that having a path in the belt tensioner from the bearing seat 48 to the belt-tensioner mounting surface which does not cross a line on the arm 14 corresponding to the parting line of the first and second sections and which does not cross a line on the spring case 16 corresponding to the parting line of the first and second segments minimizes the casting effect on offset and alignment.

In one variation, whether or not a parting line is crossed, having the belt-tensioner mounting surface of the ear of the spring case 16 be on the same segment of the belt-tensioner-spring-case casting mold as the surface of the spring case 16 that touches the pivot bushing 24 reduces the bending moment placed upon the pivot bushing 24 alleviating pinch-related wear and puts all in line with the hub load which minimizes stack-up of the arm/puller assembly offset.

In one design of any one or more or all of the expressions of the embodiment of FIGS. 1-3, the arm 10 includes a first end cap 52, and the spring case 16 includes a second end cap 54 and includes mounting holes 56 for mounting to, in one example, an automotive or heavy duty combustion engine. Non-automotive applications of the belt tensioner 10 are left to the artisan.

Several benefits and advantages are derived from one or more of the expressions of an embodiment and method of the invention. Having inwardly projecting first and second end portions of a belt-tensioner helical spring avoids out-of-plane loads or couples from assembly forces. A pivot bushing with a substantially outward or inward flared cone portion and a substantially constant diameter cylinder portion delivers improved offset control (via the cone portion) and alignment guidance (via the cylinder portion). Having a belt-tensioner arm including a post having an annular rim and having a non-circular hole portion below the annular rim enables a radial rivet joint to secure an idler pulley to the post and enables access to the non-circular hole portion of the post by a belt-tensioner arm-lifting tool to lift the arm for placing it against a belt creating tension in the belt. In one example, having the pivot bushing centroid essentially in the plane of belt loading minimizes moment loading upon the bushing itself. In the same or a different example, locking hooks on the arm and spring case make for rapid, robust assembly with solid engagement that minimizes residual torque creep from tang movement. Having a path in the belt tensioner from the bearing seat to the belt-tensioner mounting surface which does not cross a line on the arm corresponding to the parting line of the first and second sections and which does not cross a line on the spring case corresponding to the parting line of the first and second segments minimizes the casting effect on offset and alignment as can be appreciated by those skilled in the art.

The foregoing description of several expressions of an embodiment and methods of the invention has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

The invention claimed is:

1. A belt tensioner comprising:
 a) a coil spring that is coiled about a longitudinal axis, the coil spring having first and second end portions projecting radially inward from a coil in a direction toward the longitudinal axis;
 b) a belt-tensioner arm rotatable about the longitudinal axis, the belt-tensioner arm being adapted to support an idler pulley and having a first hook, wherein the first end portion of the helical spring is retained by the first hook; and
 c) a belt-tensioner spring case having a second hook, wherein the second end portion of the helical spring is retained by the second hook;
 d) a pivot bushing disposed between, and in contact with, the arm and the spring case and circumferentially surrounding the coil spring;
 e) an idler pulley supported by the arm, wherein the pivot bushing has a centroid, wherein the idler pulley has a plane of belt loading, and wherein the centroid is disposed proximate the plane of belt loading;
 wherein the retention of the first end portion of the helical spring by the first hook of the arm and the retention of the second end portion of the helical spring by the second hook of the spring case allows the helical spring to be axially stretched into tension.

2. The belt tensioner of claim 1, wherein the first and second end portions of the coil spring each project substantially radially inward.

3. The belt tensioner of claim 1, wherein the coil spring is rotationally pulled upon windup.

4. The belt tensioner of claim 1, wherein the coil spring is rotationally pushed upon windup.

5. The belt tensioner of claim 1, wherein the coil spring is in tension, wherein the arm includes a locking portion having a blocking surface, wherein the spring case includes a protrusion having a blocking surface, wherein at least one of the locking portion and the protrusion has a leading inclined surface, and wherein self unwinding of the coil spring and disassembly of the belt tensioner is prevented by engagement of the blocking surface of the protrusion with the blocking surface of the locking portion.

6. The belt tensioner of claim 1, wherein the pivot bushing includes an outward or inward flared cone portion and a substantially constant diameter cylinder portion; wherein the flared cone portion extends from and beyond one end of the substantially constant diameter cylinder portion and flares inward or outward relative to the substantially constant diameter portion.

7. The belt tensioner of claim 6, wherein the cone portion and the cylinder portion are disposed radially between, and in contact with, the arm and the spring case.

8. The belt tensioner of claim 7, wherein the spring case has a case rim, and wherein the cone portion is disposed proximate the case rim.

9. The belt tensioner of claim 1, wherein the centroid lies substantially in the plane of belt loading.

10. The belt-tensioner of claim 1 further comprising:
 a) an idler pulley having a bearing including a mounting hole having a longitudinal axis; and
 b) a belt-tensioner arm including a post, wherein the post is disposed in the mounting hole of the bearing of the idler pulley and extends longitudinally beyond the bearing, wherein the post has an annular rim deformed radially outward and over the bearing of the idler pulley creating a radial rivet joint, wherein the post has a non-circular hole portion disposed longitudinally below the annular rim and adapted for engagement by a belt-tensioner arm-lifting tool.

11. The belt tensioner of claim 10, wherein the non-circular hole portion is a star-shaped orifice.

12. The belt tensioner of claim 11, wherein the belt-tensioner arm-lifting tool is a wrench with a star-shaped head.

13. A method of assembling the belt tensioner of claim 1, wherein the coil spring is rotationally pulled upon windup and the second hook portion of the spring case is ramped, comprising the steps of:
 a) disposing the first end portion of the coil spring in contact with the arm;
 b) disposing the second end portion of the coil spring in contact with the spring case; and
 c) relatively twisting the arm and the spring case trapping the first end portion under the first hook portion and the second end portion under the second hook portion and axially stretching the coil spring into tension.

14. The belt tensioner of claim 1, wherein the coil spring is in tension and the tension applies a continued force to bias the spring case and the belt-tensioner arm together.

15. The belt tensioner of claim 14, further comprising a pivot bushing disposed between, and in contact with, the belt-tensioner arm and the spring case and circumferentially surrounding the coil spring.

16. The belt tensioner of claim 15, wherein the tension of the spring applies a continued force to the pivot bushing for alignment control.

17. The belt tensioner of claim 15, wherein the tension of the spring applies a continued force to the pivot bushing even as it wears thinner.

18. The belt tensioner of claim 1, wherein the tensioner arm includes a cup-shaped housing that houses the first hook portion and has an open end, wherein the spring case has an open end, wherein the tensioner arm and the spring case define a housing that houses the coil spring, and wherein the coil spring couples the tensioner arm and the spring case together with engagement between the tensioner arm and the spring case only at their respective open ends.

\* \* \* \* \*